US012600604B2

(12) United States Patent
Sasaoka et al.

(10) Patent No.: US 12,600,604 B2
(45) Date of Patent: Apr. 14, 2026

(54) INFORMATION ACQUISITION SYSTEM

(71) Applicant: KOBELCO CONSTRUCTION MACHINERY CO., LTD., Hiroshima (JP)

(72) Inventors: Yoshio Sasaoka, Tokyo (JP); Satoshi Okada, Tokyo (JP); Teppei Maedo, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 205 days.

(21) Appl. No.: 18/044,817

(22) PCT Filed: Sep. 14, 2021

(86) PCT No.: PCT/JP2021/033665
§ 371 (c)(1),
(2) Date: Mar. 10, 2023

(87) PCT Pub. No.: WO2022/070876
PCT Pub. Date: Apr. 7, 2022

(65) Prior Publication Data

US 2024/0025708 A1 Jan. 25, 2024

(30) Foreign Application Priority Data

Sep. 29, 2020 (JP) ................................ 2020-163893

(51) Int. Cl.
*B66C 13/48* (2006.01)
*B66C 13/06* (2006.01)

(52) U.S. Cl.
CPC ............ *B66C 13/48* (2013.01); *B66C 13/063* (2013.01)

(58) Field of Classification Search
CPC ........ B66C 13/48; B66C 13/063; B66C 13/18
See application file for complete search history.

(56) References Cited

U.S. PATENT DOCUMENTS 5,732,835 A 3/1998 Morita et al.
2021/0047154 A1* 2/2021 Hayashi ................ G05D 1/223
(Continued)

FOREIGN PATENT DOCUMENTS

JP H07187568 A * 12/1993
JP 7-187568 A 7/1995
(Continued)

OTHER PUBLICATIONS

Morita Tadashi, Dec. 28, 1993 English Machine Translation_JPH07187568 A provided by Patent Translate by EPO and Google (Year: 1993).*
Murakami Keishin, Oct. 13, 1997 English Machine Translation_JPH11119640 A provided by Patent Translate by EPO and Google (Year: 1997).*
(Continued)

*Primary Examiner* — Ashley L Redhead, Jr.
(74) *Attorney, Agent, or Firm* — Oblon, McClelland, Maier & Neustadt, L.L.P.

(57) ABSTRACT

An information acquisition system includes a first input acquisition unit that acquires masses of the attachment and the suspended cargo as first input, a second input acquisition unit that acquires information about a posture of the attachment as second input, a position estimation unit that estimates the position of at least one of the attachment and the suspended cargo, based on the first input and the second input, and an information derivation unit that derives information about the possibility of interference between the external object and at least one of the attachment and the suspended cargo, based on the position of at least one of the attachment and the suspended cargo estimated by the position estimation unit.

8 Claims, 10 Drawing Sheets

(56) References Cited

U.S. PATENT DOCUMENTS

| | | | | |
|---|---|---|---|---|
| 2022/0098012 | A1* | 3/2022 | Yamauchi | B66C 13/46 |
| 2022/0204319 | A1* | 6/2022 | Ladra | B66C 19/007 |

FOREIGN PATENT DOCUMENTS

| | | | | |
|---|---|---|---|---|
| JP | H11119640 | A | * | 10/1997 |
| JP | 11-119640 | A | | 4/1999 |
| JP | 2007254143 | A | * | 10/2007 |
| JP | 2018-95373 | A | | 6/2018 |
| JP | 2018095373 | A | * | 6/2018 |
| WO | WO 2019/229751 | A1 | | 12/2019 |
| WO | 2020/027335 | | | 2/2020 |

OTHER PUBLICATIONS

Katayama S, Oct. 4, 2007 English Machine Translation_ JP2007254143A provided by Patent Translate by EPO and Google (Year: 2007).*

Tamaki K, Jun. 21, 2018 English Machine Translation_ JP2018095373 A provided by Patent Translate by EPO and Google (Year: 2018).*

Extended European Search Report issued Feb. 20, 2024 in European Patent Application No. 21875178.2, 10 pages.

International Search Report with English translation mailed on Dec. 7, 2021 in PCT/JP2021/033665 filed on September. 14, 2021 (4 pages).

Office Action issued on Oct. 7, 2025 in Japanese Patent Application No. 2020-163893 (with English translation) 42 pages.

* cited by examiner

FIG.6

| | BOOM LENGTH (m) | | | | | | | | | |
|---|---|---|---|---|---|---|---|---|---|---|
| WORKING RADIUS(m) | 18.3 | 21.3 | 24.4 | 27.4 | 30.5 | 33.5 | 36.6 | 39.6 | 42.7 | 45.7 |
| 5.0 | 200.0/5.0m | 175.0/5.5m | | | | | | | | |
| 6.0 | 189.6 | 175.0 | 150.0/6.0m | 150.0/6.6m | | | | | | |
| 7.0 | 163.9 | 163.5 | 150.0 | 150.0 | 125.0/7.1m | 125.0/7.6m | | | | |
| 8.0 | 144.3 | 143.9 | 143.5 | 143.3 | 125.0 | 125.0 | 100.0/8.2m | 100.0/8.7m | | |
| 9.0 | 128.8 | 128.4 | 128.0 | 127.8 | 125.0 | 123.1 | 100.0 | 100.0 | 98.8/9.2m | 87.5/9.7m |
| 10.0 | 116.3 | 115.8 | 115.5 | 115.2 | 114.8 | 114.6 | 100.0 | 100.0 | 96.7 | 87.5 |
| 12.0 | 90.6 | 90.4 | 90.2 | 90.0 | 89.8 | 89.6 | 89.6 | 89.4 | 89.2 | 85.3 |
| 14.0 | 73.0 | 72.7 | 72.5 | 72.3 | 72.1 | 71.9 | 71.8 | 71.6 | 71.4 | 71.3 |
| 16.0 | 61.0 | 60.7 | 60.4 | 60.2 | 60.0 | 59.8 | 59.7 | 59.4 | 59.2 | 59.1 |
| 18.0 | 52.9/17.4m | 51.9 | 51.6 | 51.4 | 51.2 | 50.9 | 50.8 | 50.5 | 50.3 | 50.2 |
| 20.0 | | 45.3 | 45.0 | 44.7 | 44.5 | 44.2 | 44.1 | 43.8 | 43.6 | 43.4 |
| 22.0 | | 45.1/20.1m | 39.7 | 39.5 | 39.2 | 39.0 | 38.8 | 38.5 | 38.3 | 38.1 |
| 24.0 | | | 38.2/22.7m | 35.3 | 35.0 | 34.7 | 34.6 | 34.3 | 34.0 | 33.9 |
| 26.0 | | | | 32.9/25.4m | 31.5 | 31.2 | 31.1 | 30.8 | 30.5 | 30.3 |
| 28.0 | | | | | 28.6/28.0m | 28.3 | 28.2 | 27.8 | 27.6 | 27.4 |
| 30.0 | | | | | | 25.9 | 25.7 | 25.4 | 25.1 | 24.9 |
| 32.0 | | | | | | 25.2/30.6m | 23.6 | 23.2 | 23.0 | 22.8 |
| 34.0 | | | | | | | 22.4/33.3m | 21.4 | 21.1 | 20.9 |
| 36.0 | | | | | | | | 19.9/35.9m | 19.5 | 19.3 |
| 38.0 | | | | | | | | | 18.1 | 17.9 |
| 40.0 | | | | | | | | | 17.8/38.6m | 16.6 |
| 42.0 | | | | | | | | | | 15.9/41.2m |

UNIT: t

INFORMATION ACQUISITION SYSTEM

TECHNICAL FIELD

The present invention relates to an information acquisition system for use in working machines such as cranes, having an attachment, such as a boom, a jib, a strut, and a mast, and a support unit (a turning body, etc.) that supports the attachment, the information acquisition system being configured to acquire information about the possibility of interference between an external object and at least one of the attachment and a suspended cargo suspended by the attachment.

BACKGROUND ART

In a crane that can lift a suspended cargo, attachments, such as a boom, are turnably attached to the front side of a crane body that is a support unit as shown in FIG. 10. When a wind-up winch provided in the crane body winds up a wire rope, a suspended cargo on the ground is lifted up by a hook which is connected to the wire rope and is suspended from the tip of a jib that is an attachment. Long attachments deform due to their own weights and the suspended cargo. Specifically, when the suspended cargo is suspended or the rope is wound up to suspend the suspended cargo, the attachments deflect. When the rope is wound up while the suspended cargo is suspended, the attachments deflect forward so that the position of the suspended cargo moves forward, resulting in a change in a working radius, i.e., a working area. The attachments typically include a boom, a jib, a strut, and a mast.

In a ground cutting work with a crane, a boom is deflected by a hook hanging a suspended cargo and a suspended load, which causes an increase in the working radius of the crane as compared with the state where the attachment, such as a boom, is not deflected, as shown in FIG. 10.

As shown in Patent Literature 1, a technique for a crane simulator for simulating the motion of a crane has been proposed to perform simulation by efficiently obtaining a total rated load, or the like, that varies following every motion of the crane. According to the technique, when input operation is performed on a crane displayed on a display unit through an operation unit, a display mode of the crane displayed on the display unit is updated in response to the input operation, and a rated total load calculation unit calculates a rated total load with which the crane can work, and displays the rated total load on the display unit. When a desired rated total load is input from a load input window, a working radius calculation unit calculates a working area conforming to the rated total load, and displays the working area on the display unit.

Patent Literature 2 proposes a control device for a crane to enhance the safety in the crane. In the control device for a crane, a boom control signal αr and a winch control signal βr for obtaining target values Xr and Yr are simultaneously output to a boom drive unit and a winch drive unit in a drive unit 30, with a current working radius X and a current lifting height Y which change in accordance with a deflection amount of a boom, as feedback values, and thereby a boom derricking angle and a rope length are simultaneously controlled.

CITATION LIST

Patent Literature

Patent Literature 1: Japanese Patent Laid-Open No. 1995-119640

Patent Literature 2: Japanese Patent Laid-Open No. 1999-187568

SUMMARY OF INVENTION

Technical Problem

As described in Patent Literature 1, software for construction planning simulation systems for construction using construction machines, such as cranes, has been developed. However, crane construction simulations using the conventional construction planning simulation systems have issues such as, for example, a large difference between simulation and actual work in terms of the working radius, the lifting height, etc., due to disability to express deformation of a boom or other structures caused by suspended load. The present invention has been made in view of the above issue of the prior art, and an object of the present invention is to provide an information acquisition system allowing more realistic simulation by providing a construction plan simulation system with a function of computing and displaying deformation of an attachment that is caused by the weight of a suspended cargo and thereby reducing a difference between simulation and actual work.

Solution to Problem

An information acquisition system of the present invention is an information acquisition system for acquiring information about possibility of interference between an external object and at least one of an attachment of a working machine and a suspended cargo suspended by the attachment, the working machine having a support unit and the attachment that is supported by the support unit for suspending the cargo. The system includes a first input acquisition unit that acquires masses of the attachment and the suspended cargo as first input, a second input acquisition unit that acquires information about a posture of the attachment as second input, a position estimation unit that estimates a position of at least one of the attachment and the suspended cargo, based on the first input and the second input, and an information derivation unit that derives information about the possibility of interference between the external object and at least one of the attachment and the suspended cargo, based on the position of at least one of the attachment and the suspended cargo estimated by the position estimation unit.

Since the information acquisition system of the present invention includes the position estimation unit that estimates the position of at least one of the attachment and the suspended cargo, based on the first input and the second input, it is possible to faithfully reproduce the state of an actual working machine during working by taking into consideration the deformation in simulation and in actual boom work, and to thereby provide a work simulation close to reality.

BRIEF DESCRIPTION OF DRAWINGS

FIG. 6 is an explanatory view of a rated total load table indicating the relationship among the boom length of the crane, the radius of a suspended cargo carrying work, and a maximum permissible load as an example of the crane information in the data unit of the information acquisition system of the first embodiment.

DESCRIPTION OF EMBODIMENTS

Figure 1:
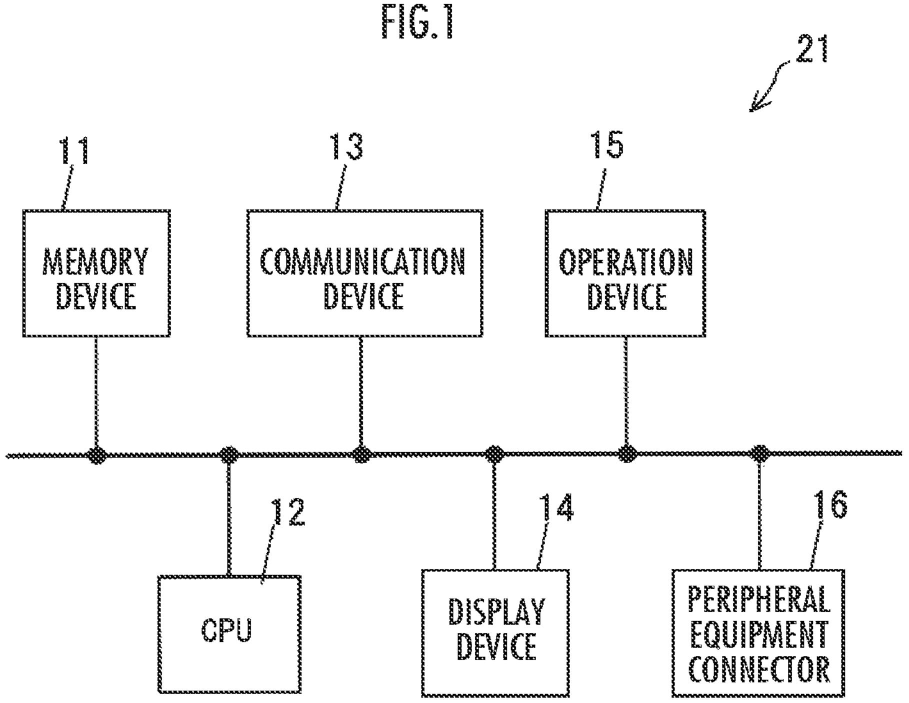
FIG. 1 is a configuration diagram showing a basic configuration of a computer used as hardware for an information acquisition system of a first embodiment.

The information acquisition system will be described below with reference to the drawings. The information acquisition system of the present embodiment will be described using a simulation system for construction process planning involving a crane work using a working machine as an example. The present invention is not limited to the embodiments described below. In the embodiment, component members having substantially the same function and configuration are denoted by the same reference numerals to omit redundant description thereof.

In the following description, "acquiring" means that a component member executing any information processing in order to prepare information for other information processing, such as the component member receiving the information, searching for or reading the information from a database or a memory, performing specified arithmetic processing on basic information received, detected, or obtained by other means, so as to perform operation, such as calculation, measurement, estimation, setting, determination, search, and prediction, on the information, decoding packets received or obtained by other means to actualize the information, and further storing the information calculated or obtained by other means in a memory.

First Embodiment

FIG. 1 is a configuration diagram showing a basic configuration of a computer simulation system device 21 used as hardware for an information acquisition system of a first embodiment. The information acquisition system of the present embodiment is implemented by a general computer performing processing according to a working area simulation program.

The computer simulation system device 21 is provided with a memory device 11, such as a non-volatile flash memory or a hard disk, that stores various data and a working area simulation program, a CPU 12 that processes various data according to the program stored in the memory device 11, a communication device 13 including devices, such as a wired device of Ethernet (registered trademark) standard or a wireless LAN, that perform data communication with an external device (not shown) such as an external computer, a display device 14, such as a liquid crystal display, that displays images to a user who performs operation, an operation device 15, such as a keyboard, a mouse, or a touch panel, that receives user operation, and a peripheral equipment connector 16, such as a universal serial bus (USB) device, that connects peripheral devices.

Figure 2:
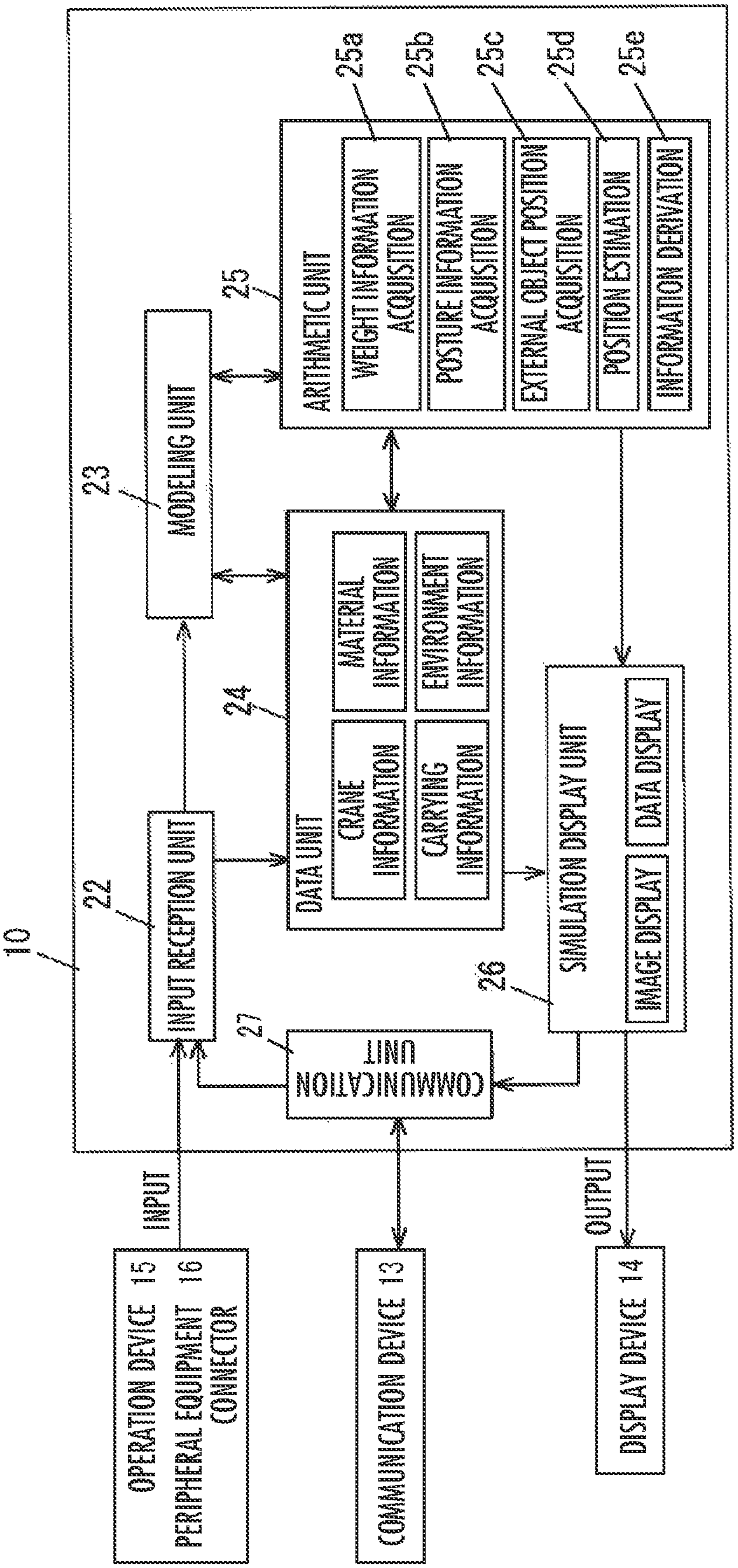
FIG. 2 is a block diagram showing a functional configuration of the information acquisition system of the first embodiment.

FIG. 2 shows a block diagram showing the functional configuration of an information acquisition system 10 constituted from the simulation system device 21.

The information acquisition system 10 shown in FIG. 2 is provided with an input reception unit 22 that receives various data, a modeling unit 23, a data unit 24 that stores various data, an arithmetic unit 25, a simulation display unit 26, and a communication unit 27 as functional units. These functional units are implemented when the working area simulation program is developed in the memory device 11, and the CPU 12 performs arithmetic operation as needed. The functional units of the information acquisition system 10 for executing a working area crane simulation will be described in order below.

[Input Reception Unit 22]

The input reception unit 22 receives input of various data necessary for work simulation (data stored in the data unit 24, such as crane information, material information, and environmental information including obstacles) from the outside. The input reception unit 22 receives data input by the user via the operation device 15 (see FIG. 1), and further receives data input via the peripheral equipment connector 16 (see FIG. 1) and the communication device 13 (see FIG. 1). The information acquisition system 10 may also use various data, necessary for work simulation, stored in advance in the memory device 11 (see FIG. 1) without via the input reception unit 22. In addition to being used for initial reception, the input reception unit 22 may also be used to receive data input into the modeling unit 23 and the data unit 24 at any time.

[Modeling Unit 23]

The modeling unit 23 performs processing to generate model data for calculation, such as polygon data and voxel data, corresponding to various data, material information (including suspended cargo W), environment information including obstacles, and the like, received at the input reception unit 22, and to store the model data in the data unit 24 described later (the processing including data update processing). When real data acquired from the outside through the input reception unit 22 can be used for calculation without any processing, the modeling unit 23 stores the acquired data as it is in the data unit 24.

The modeling unit 23 has a center of gravity calculation function. The center of gravity calculation function is to calculate the center of gravity of each material and crane part based on the material information and the crane information stored in the data unit 24, and to store in the data unit 24 the center of gravity information including the calculated center of gravity, in association with each of the materials.

For example, when a crane carries a material, the posture of the lifted material deforms due to the position of the center of gravity of the material. Therefore, in the center of gravity calculation function of the modeling unit 23, the center of gravity is calculated as data to supplement the material information. The center of gravity information on each material and crane part, calculated with the center of gravity calculation function of the modeling unit 23, is used for deflection amount calculation and for generation of route candidates in the arithmetic unit 25.

[Data Unit 24]

As shown in FIG. 2, the data unit 24 in the information acquisition system 10 of the present embodiment includes the crane information, the material information, the carrying information, and the environment information. These information will be described in order below.

(Crane Information)

The crane information includes specification data, such as the type, size, weight (including weight information on each part such as a boom), maximum working radius, and lifting performance of a crane CRN, crane control information (lifting speed of the crane, turning speed of the crane, etc.), posture information about the posture, including the posture of each part such as a boom, a crane placement position, and other information. The crane information is used when a target crane is 3D-modeled. As the crane information, actual crane specification data and 3D data that is 3D-modeled based on the crane specification data are stored in associated with an identifier for each crane (attached with an identifier). Model data for the crane information is generated in the modeling unit 23. For modeling the crane CRN, the modeling unit 23 sets a reference coordinate system based on crane position information in the crane information. Data indicating the position (coordinates) of various parts based on a Z axis (perpendicular direction) of the reference coordinate system (orthogonal XYZ axes) are stored as posture information in the data unit 24.

Figure 3:
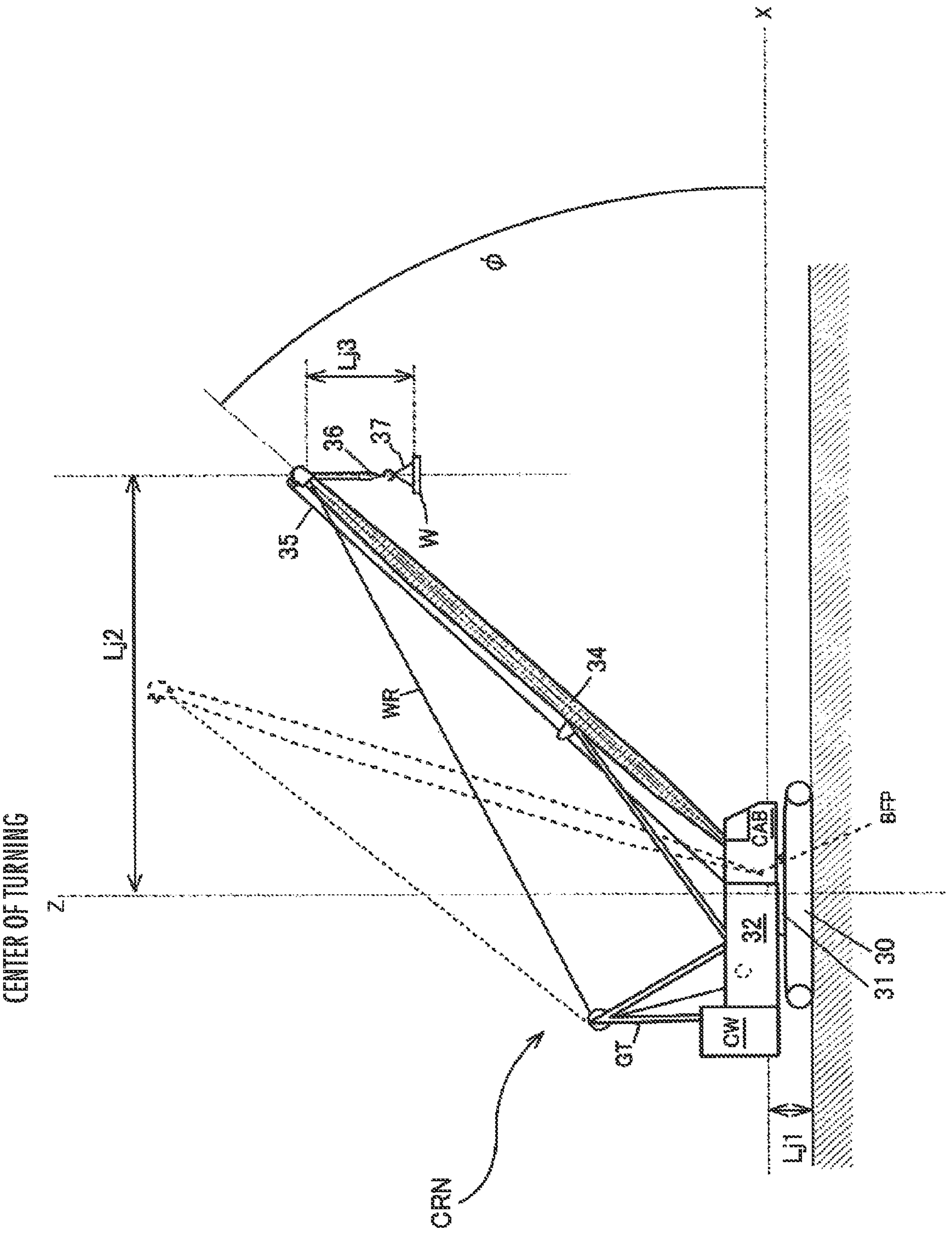
FIG. 3 is a side view of a crane for illustrating a modeled target crane in the information acquisition system of the first embodiment.
Figure 4:
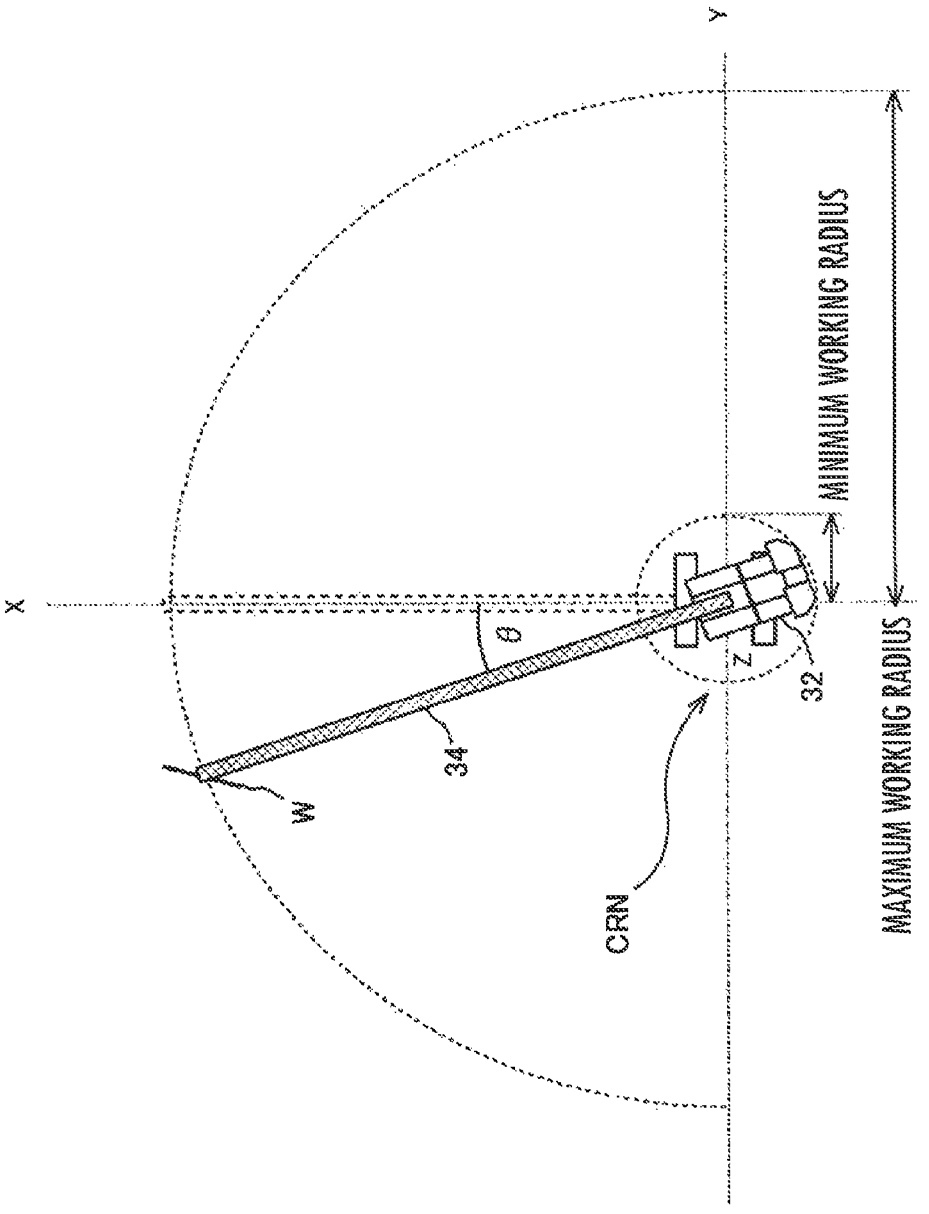
FIG. 4 is a top view of the crane shown in FIG. 3.

FIG. 3 is a side view of the crane CRN for illustrating a modeled target crane. FIG. 4 is a top view of the crane CRN shown in FIG. 3. As shown in the drawings, in the reference coordinate system in the following description, X: a first direction (a forward direction of the suspended cargo W, i.e. a radial direction passing through an initial position of the suspended cargo W), Y: a second direction (a lateral direction of the suspended cargo W, i.e., a tangential direction of a turning circle at the initial position), and Z: a third direction (a vertical direction of the suspended cargo W, i.e., a perpendicular direction) define basic coordinates. The crane CRN can be operated to move the suspended cargo W in a direction defined by a first angle θ (a turning angle) and a second angle ϕ (a derricking angle: an inclination angle) of a boom 34. For example, in FIG. 4, the coordinates (XW, Yw, Zw) of the boom 34 after turning around the Z axis by a given angle (θ) that is the first turning posture angle (θ) are coordinates after turning around the Y axis by a given angle (ϕ) that is the second turning posture angle (ϕ).

The crane CRN as a working machine has a lower travel body 30, and an upper turning body 32 turnably mounted, as a support unit, on the lower travel body 30 via a turning device 31. The crane CRN has a cabin CAB constituting an operator cabin provided in front of the upper turning body 32, and a counterweight CW provided in the rear. The crane CRN is provided with the boom 34 as an attachment that is provided on an upper part of the upper turning body 32 and that extends outward so as to allow derricking. The boom 34 has a proximal end (lower end) supported by the upper turning body 32 so as to allow derricking around a boom foot pin BFP. The boom 34 has an upper tip supported by a wire rope WR through a gantry GT so as to allow derricking. The crane CRN is further provided with a wire rope 35 hanging directly downward from the tip of the boom 34, and a hook unit 36 attached to the tip of the wire rope 35. A material as the suspended cargo W is attached to the hook unit 36 of the crane CRN via a bundling rope 37 and carried. The wire rope 35 is received (wound up) and delivered (wound down) by a winch not shown.

The modeled target crane is configured such that an operator can operate the turning device 31 and the boom 34, etc., to perform various operations including turning and derricking the boom 34, and delivering and winding up the wire rope 35, while visually recognizing the position and shape of other worker and heavy machines, and the position of the suspended cargo W in an area directly below the tip of the boom 34, based on images from a camera (not shown) that captures the area directly below the upper tip of the boom 34.

The modeled target crane is further configured such that an acceleration sensor (not shown) or a gyro sensor (not shown) is provided at the upper tip of the boom 34. In simulation, the acceleration sensor detects acceleration that is speed change in one second (in three-axis directions (X axis, Y axis, and Z axis)) at the upper tip during derricking, for example, and the gyroscope sensor detects angular acceleration that is a change in angle in one second with respect to the reference axis during derricking, for example.

As size data in the crane information for modeling the crane CRN, Lj1 (distance from the ground to the boom foot pin BFP on the Z axis that is the center of turning), Lj2 (distance from the Z axis that is the center of turning of the turning device 31 to the tip of the boom 34), and Lj3 (distance from the tip of the boom 34 to the suspended cargo W) are input into the information acquisition system 10. In addition, as the posture information for modeling the crane CRN, maximum and minimum working radii, lifting height, rated speed (lifting, turning) are also input into the data unit 24 in the information acquisition system 10. The posture information includes at least one of the lifting speed for lifting the suspended cargo W and the lowering speed for lowering the suspended cargo W, and the lowering (free-fall) speed while descending speed is controlled. The acceleration during derricking and turning of the boom 34, as well as the lifting speed and lowering speed are also stored in the data unit 24 (or updated) at each time.

Figure 5:
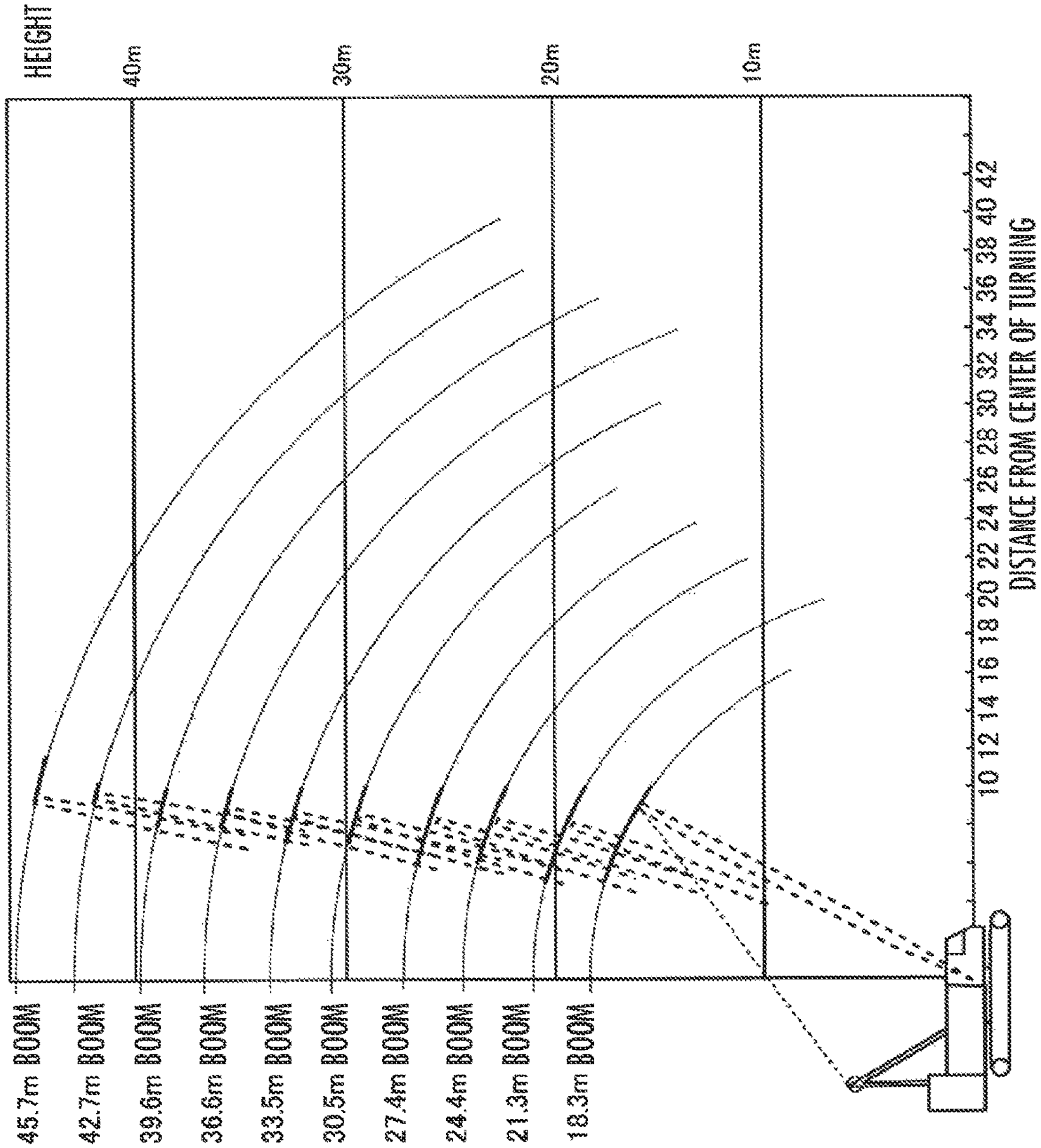
FIG. 5 is an explanatory view illustrating chart data indicating the relationship between a boom length of the crane, based on lifting performance data as an example of crane information in a data unit of the information acquisition system of the first embodiment, and a distance from the center of a turn that allows carrying operation of a suspended cargo.

The crane information stored in the data unit 24 includes chart data indicating the relationship between the boom length of the crane CRN based on crane lifting performance data and the distance from the center of turning that allows suspended cargo carrying operation shown in FIG. 5, and total rated load table data (deformation state definition table) indicating the relationship among the boom length, the radius of the suspended cargo carrying operation, and the maximum permissible load of the crane CRN shown in FIG. 6. The deformation state of the boom of the crane CRN is defined for each cell in the rated total load table as the deformation state definition table. Specifically, the data unit 24 has the boom deformation data corresponding to each condition in the rated total load table, so that the corresponding deformation data can be identified from the crane information and suspended cargo information. The data unit 24 also holds posture change information about the posture change of the boom 34 over prescribed time (a plurality of times). The posture change information includes the acceleration of the boom 34 during derricking and turning.

(Material Information)

The material information indicates characteristics of the materials of the suspended cargo W, such as the weight (weight information), size, shape, position of the center of gravity of the material, and others. In order to model the target crane, data on actual materials used for constructing a building to be constructed (a target) and data modeled based on the data are associated with an identifier for each material and stored in the data unit 24. Model data for the material information is generated in the modeling unit 23.

(Carrying Information)

The environment information includes carrying route information (position information on the suspended cargo W) such as a start point and an end point in carrying the suspended cargo W, and passing points to pass through, and further includes time information such as a time zone in which each material is carried.

(Environment Information)

Figure 7:
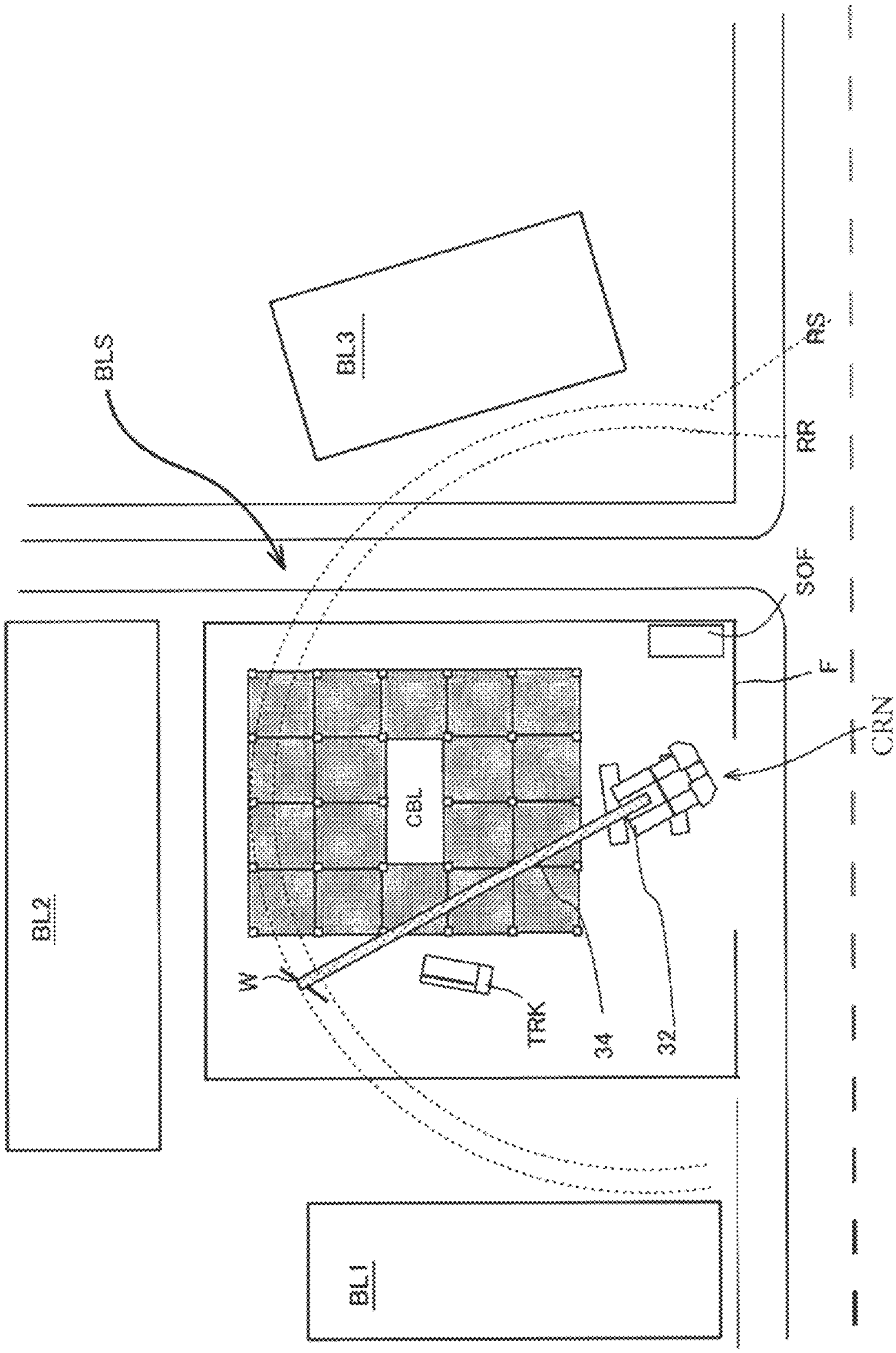
FIG. 7 is a top view schematically showing a crane and a building site modeled as a three-dimensional model for virtual space in a simulation device in the first embodiment.

The environment information stored in the data unit 24 includes, for example, virtual space data (a top view in virtual space) generated by simulating the crane CRN and the building site modeled as 3D models shown in FIG. 7. The environment information, i.e., the environment data, includes, for example, latitude and longitude position data on obstacles (materials (not shown) and a fence F of a building site BLS, a building to be constructed CBL itself that is under construction, a material carrying truck TRK, a site office SOF, and existing buildings BL1, BL2 and BL3 around the site (and other cranes when there is more than one crane)) that are external objects around an actual crane CRN of the model shown in FIG. 7.

Data on real estate, or the like, in the environment information on obstacles is obtained from, for example, base map information (geospatial information) provided by the Geographical Survey Institute and from geospatial information created by various parties such as local governments and private enterprises.

In addition, when the present embodiment is combined with a building information modeling (BIM) simulation system, and the environment information is present on the BIM simulation system side, then that environment information is acquired. When the present embodiment is not combined with the BIM simulation system, the environment information is input through an input/output device. In order to model the target building site BLS, the environment data and model data modeled based on the environment data are stored in the data unit 24 in association with an identifier for each obstacle.

Model data for the environment information is generated in the modeling unit 23. The environment information, i.e., the environment data, is used together with the model data, for deflection amount calculation and for generation of route candidates in the arithmetic unit 25. As a result of the calculation, a working radius RS of the boom 34, which is changed due to deflection of the boom 34, can be simulated as shown in FIG. 7. Here, as shown in FIG. 7, since the boom 34 in simulation deflects due to the hook hanging the suspended cargo W and its suspended load, the working radius RS of the boom 34 is larger than a working radius RR of the boom 34 without deflection.

[Arithmetic Unit 25]

The arithmetic unit 25 holds various arithmetic expressions such as calculation expressions for estimating deformation amounts of the boom 34 and the upper turning body 32, and performs arithmetic processing for the working area simulation based on the information recognized by the modeling unit 23 and stored in the data unit 24. In order to simulate the working area in which the crane CRN having the target boom 34 can work, the arithmetic unit 25 includes a weight information acquisition unit 25*a*, a posture information acquisition unit 25*b*, an external object position acquisition unit 25*c* that acquires information about the position of external objects other than the crane CRN from the data unit 24, a position estimation unit 25*d* that estimates the position of the boom 34 and the suspended cargo W based on the information from the weight information acquisition unit 25*a* and the posture information acquisition unit 25*b*, and an information derivation unit 25*e* that derives information about the possibility of interference between the external objects and at least one of the boom 34 and the suspended cargo W.

The weight information acquisition unit 25*a* is the first input acquisition unit that acquires from the data unit 24 weight information including the weight (mass) of the boom 34 and the weight (mass) of the suspended cargo W lifted by the crane CRN.

The posture information acquisition unit 25*b* is the second input acquisition unit that acquires from the data unit 24 posture information including the posture of the boom 34 of the crane CRN. In addition, the posture information acquisition unit 25*b* also acquires posture change information about change in posture of the boom 34 over prescribed time (a plurality of times) as the second input from the data unit 24.

The position estimation unit 25*d* estimates the position of at least one of the boom 34 and the suspended cargo W, based on the weight information as the first input and the posture information as the second input. Specifically, the position estimation unit 25*d* can calculate a deflection amount of the boom 34 from only the weight of the suspended cargo W of the boom 34 in a stopped state and the posture information on the boom 34. For example, the position estimation unit 25*d* estimates the position of at least one of the boom 34 and the suspended cargo W based on the derricking angle of the boom 34 in the posture information.

The position estimation unit 25*d* can also estimate the position of at least one of the boom 34 and the suspended cargo W based on at least one of the lifting speed at the time of lifting the suspended cargo and the lowering speed at the time of lowering the suspended cargo W by the boom 34. Furthermore, the position estimation unit 25*d* can estimate the deformation amount of the boom 34, based on the posture information and the deformation state definition table (rated total load table data) defining the deformation state of the boom 34 for each mass of the suspended cargo W, and estimate the position of at least one of the boom 34 and the suspended cargo W depending on the deformation amount.

The information derivation unit 25*e* derives information about the possibility of interference between an external object and at least one of the boom 34 and the suspended cargo W, based on the position of at least one of the boom 34 and the suspended cargo W estimated by the position estimation unit 25*d*.

The position estimation unit 25*d* can further estimate the deformation amount of the upper turning body 32 (for example, the inclination of the upper turning body 32 with respect to the lower travel body 30) and the deformation amount of the boom 34, based on the weight information as the first input and the posture information as the second input, and estimate the position of at least one of the boom 34 and the suspended cargo W determined depending on the deformation amount. For example, the position estimation unit 25*d* can estimate the position of at least one of the boom 34 and the suspended cargo W over prescribed time, based on the weight information as the first input and the posture information about the change in posture of the boom 34 as the second input. Specifically, the position estimation unit 25*d* can estimate the deformation amount of the upper turning body 32 and the deformation amount of the boom 34 over prescribed time, and estimate the position of at least one of the boom 34 and the suspended cargo W determined depending on the deformation amounts.

When the posture change information includes acceleration during derricking of the boom 34, the position estimation unit 25*d* can estimate the position of at least one of the boom 34 and the suspended cargo W based on the acceleration during the derricking.

When the posture change information includes acceleration during turning of the boom 34, the position estimation unit 25*d* can estimate the position of at least one of the boom 34 and the suspended cargo W based on the acceleration during the turning.

When the posture change information includes at least one of the lifting speed at the time of lifting the suspended cargo W and the lowering speed at the time of lowering the suspended cargo W, the position estimation unit 25*d* can estimate the position based on the lifting speed at the time of lifting.

The position estimation unit 25*d* can estimate the deformation amount of the boom 34 over prescribed time, based on the posture of the boom 34 and the deformation state definition table defining the deformation state of the boom 34 for each mass of the suspended cargo W, and estimate the position of at least one of the boom 34 and the suspended cargo W determined depending on the deformation amount.

When the posture change information includes at least one of the lifting speed at the time of lifting and the lowering speed at the time of lowering by the boom 34, the position estimation unit 25*d* can also estimate the position of at least one of the boom 34 and the suspended cargo W based on at least one of the lifting speed at the time of lifting the suspended cargo W and the lowering speed at the time of lowering the suspended cargo W by the boom 34. Furthermore, the position estimation unit 25*d* can estimate the deformation amount of the boom 34, based on the posture information and the deformation state definition table (rated total load table data) defining the deformation state of the boom 34 for each mass of the suspended cargo W, and estimate the position of at least one of the boom 34 and the suspended cargo W depending on the deformation amount.

Figure 8:
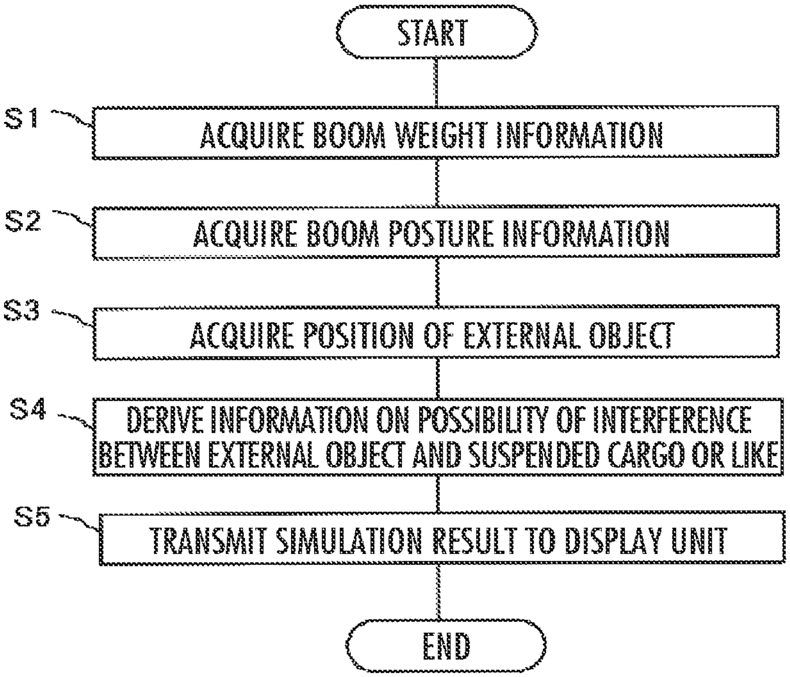
FIG. 8 is a flowchart showing the outline of an example of a crane simulation with a crane, executed by the information acquisition system of the first embodiment.

FIG. 8 is a flowchart schematically showing the crane simulation with a crane as an example of the working area simulation executed by the CPU 12 (FIG. 2) as the arithmetic unit 25.

Step S1: the CPU 12 acquires boom weight information and holds the information in the memory device 11 (FIG. 2). The boom weight information includes, for example, the weight, size and shape of the boom 34 and the materials of the suspended cargo W. The boom weight information is included in the crane control information, which is the basis of the operation speed of the crane (for example, the lifting speed of the crane, the turning speed of the crane, etc.).

Step S2: the CPU 12 acquires a posture information on the boom 34 and holds the information in the memory device 11 (FIG. 2). The boom posture information includes, for example, the first turning angle (θ) and the second turning angle (θ) as the position information on the boom 34 of the crane.

Step S3: the CPU 12 estimates the position of at least one of the boom 34 and the suspended cargo W based on the boom weight information and the posture information regarding the boom 34, and holds the result in the memory device 11.

Step S4: the CPU 12 derives, i.e., simulates, information about the possibility of interference between an external object and at least one of the boom 34 and the suspended cargo W based on the estimated position of at least one of the boom 34 and the suspended cargo W in the memory device 11. The simulation is executed using a prescribed expression to calculate the deformation amount of the boom.

Step S5: the CPU 12 transmits the result of simulation derivation to the display device 14 via the simulation display unit 26.

The arithmetic unit 25 can further generate route candidates by calculating carrying routes of the suspended cargo W that can prevent the suspended cargo W from coming into contact with obstacles, based on the information recognized by the modeling unit 23 and stored in the data unit 24, and predict carrying time in the respective route candidates. Specifically, the arithmetic unit 25 can compute the carrying routes and the carrying time of the material, based on the crane information, the material information, and the carrying route information (for example, the positions of a start point, passing points and an end point of the material as a suspended cargo input by the user).

[Simulation Display Unit 26]

The simulation display unit 26 instructs the display device 14 (FIG. 2) to display the carrying route of the suspended cargo W as the result of arithmetic operation in the arithmetic unit 25 and various information in the data unit 24.

[Communication Unit 27]

The communication unit 27 instructs the communication device 13 (FIG. 2) to input data into the input reception unit 22 and to output data to the simulation display unit 26 by the modeling unit 23.

Second Embodiment

A second embodiment is identical in configuration to the first embodiment except that part of the working area simulation shown in FIG. 8, which is executed by the CPU 12 (FIG. 2) in the system, is different.

Figure 9:
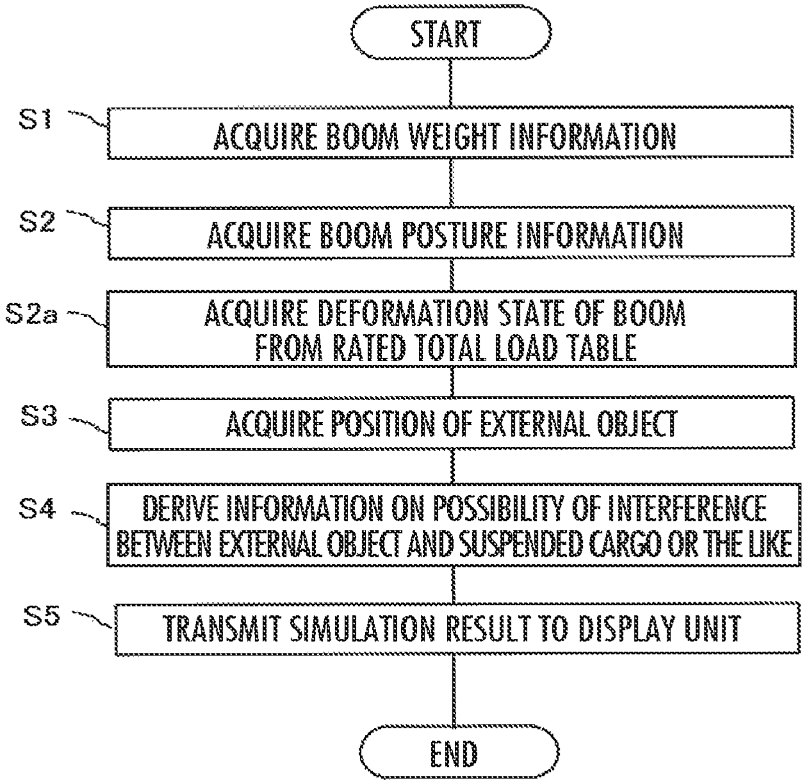
FIG. 9 is a flowchart showing the outline of an example of the crane simulation with a crane, executed by the information acquisition system of the first embodiment.
Figure 10:
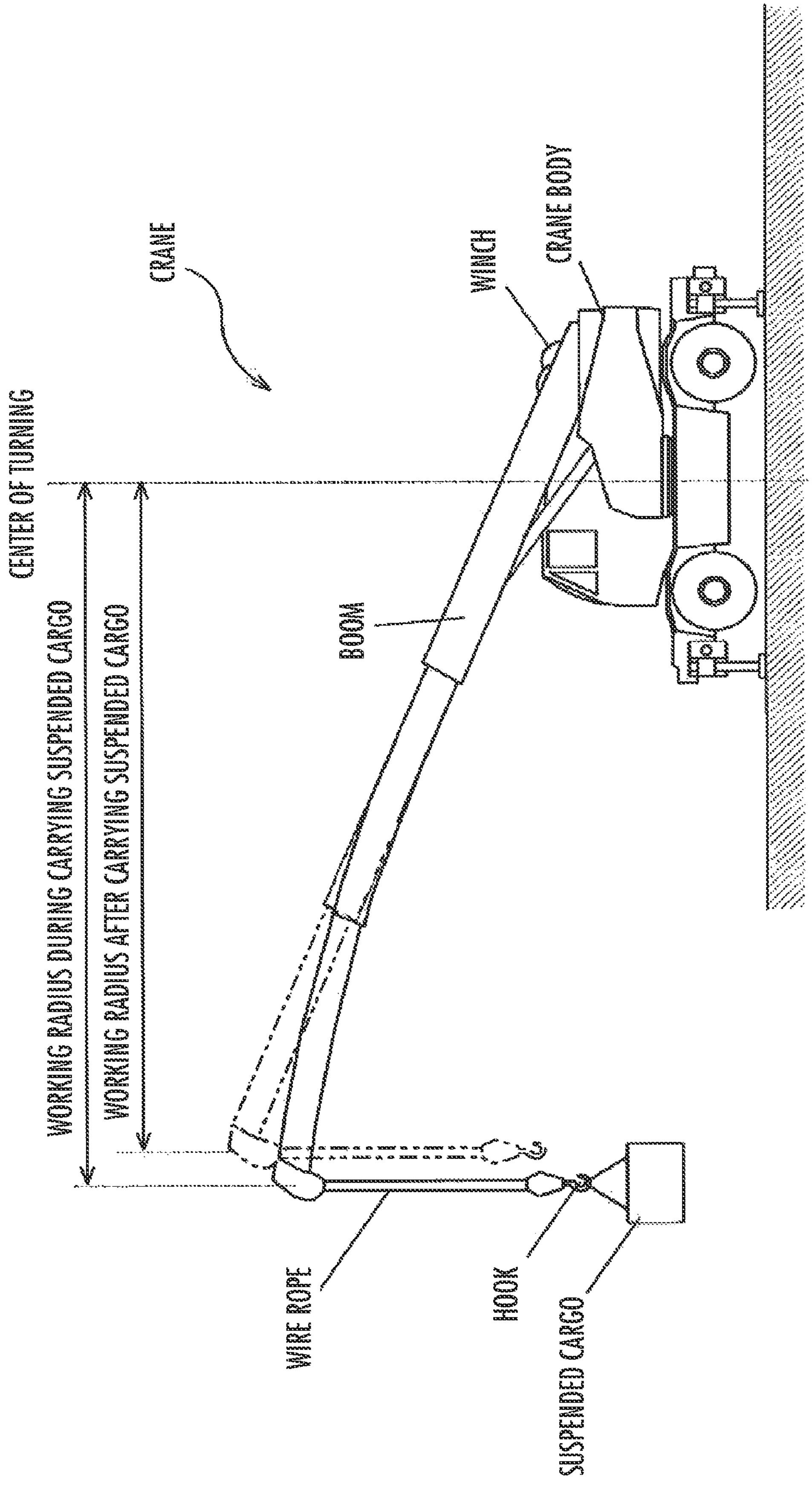
FIG. 10 is a side view of the crane for schematically illustrating the state of deformation of a boom of the crane.

FIG. 9 is a flowchart schematically showing the crane simulation with a crane as an example of the working area simulation executed by the CPU 12 (FIG. 2) in the second embodiment as the arithmetic unit 25. The crane simulation flow in FIG. 9 is identical to the crane simulation flow in FIG. 8 in the first embodiment except that step S2*a* is executed between steps S2 and S3. Therefore, only step S2*a* in the second embodiment, which is different from the first embodiment, is described.

In step S2*a*, the CPU 12 acquires the boom deformation state from the deformation state definition table (see FIG. 6) and holds the deformation state in the memory device 11. Then, in step S3, the CPU 12 estimates the position of at least one of the boom 34 and the suspended cargo W based on the boom weight information, the posture information and the deformation state regarding the boom 34, and holds the result in the memory device 11.

In both the embodiments, the information acquisition system of the embodiments is applicable even in the case where the attachment is a TELESCO (registered trademark) (telescopic) boom or a lattice boom. In both the embodiments, the information acquisition system of the embodiments is applicable even in the case where a mast or strut, other than the boom, is used as the attachment. Furthermore, in both the embodiments, the information acquisition system of the embodiments is applicable to wheel cranes (rough terrain cranes, truck cranes, all terrain cranes), mobile cranes such as crawler cranes, fixed cranes such as jib cranes, climbing cranes and tower cranes, cranes of cuffing specification, and cranes of fixed jib specification.

Thus, according to the present invention, the environment information about structures, or the like, located in the construction site, the material information, and the construction machine information (for example, crane information) for use in carrying the materials are stored in the data unit. A space through which the suspended cargo can pass is calculated from the construction machine information and the environment information stored in the data unit, and based on the space, the material information, and the construction machine information, a plurality of routes through which the material can be carried is calculated. A simulation of carrying the material is configured to be performed by using any one of the calculated plurality of routes. This provides such effects that the route fittable in the space through which the suspended cargo can pass can be determined swiftly, regardless of the skill level of a crane operator, automatic crane operation using the obtained simulation can be achieved, and further, the time required for construction planning can be shortened.

REFERENCE SIGNS LIST

10 Information acquisition system
22 Input reception unit
23 Modeling unit
24 Data unit
25 Arithmetic unit
26 Simulation display unit
27 Communication unit
30 Lower travel body
31 Turning device
32 Upper turning body
34 Boom
35 Wire rope
36 Hook unit
37 Bundling rope
W Suspended cargo
CRN Crane
CAB Cabin

The invention claimed is:

1. A construction planning simulation system for construction using a crane for acquiring information about possibility of interference between an external object and an attachment of the crane and a suspended cargo suspended by the attachment, the crane having a lower travel body, an upper turning body, and the attachment that is supported by the upper turning body for suspending the cargo and that extends outward so as to allow derricking, comprising:
at least one processor comprising circuitry configured to:
receive first data, as a first input to the at least one processor, the first data including masses of the attachment and the suspended cargo;
receive second data, as a second input to the at least one processor, the second data including information about a posture of the attachment as second input;
model, via the circuitry, a 3 dimensional model of the crane based on the first input and the second input and estimate a position of the attachment and the suspended cargo based on the 3 dimensional model of the crane; and
compute, via the circuitry, the possibility of interference between the external object and the attachment and the suspended cargo, based on the estimated position of the attachment and the suspended cargo,
the information about the posture includes a derricking angle of the attachment, and
the position of the attachment and the suspended cargo is estimated based on the derricking angle,
wherein the at least one processor is configured to control a movement of the crane to follow a carrying route of the suspended cargo from the 3 dimensional model generated by the circuitry to prevent the suspended cargo from contacting the external object during the movement.

2. The construction planning simulation system according to claim 1, wherein the at least one processor is configured to estimate a deformation amount of the upper turning body and a deformation amount of the attachment based on the first input and the second input, and estimate the position of the attachment and the suspended cargo that is determined depending on the deformation amounts.

3. The construction planning simulation system according to claim 1, wherein
the information about the posture includes at least one of lifting speed at time of lifting the suspended cargo and lowering speed at time of lowering the suspended cargo, and
the position of the attachment and the suspended cargo is estimated by the at least one processor based on at least one of the lifting speed and the lowering speed.

4. A construction planning simulation system for construction using a crane for acquiring information about possibility of interference between an external object and an attachment of the crane and a suspended cargo suspended by the attachment, the crane having a lower travel body, an upper turning body, and the attachment that is supported by the upper turning body for suspending the cargo and that extends outward so as to allow derricking, comprising:
at least one processor comprising circuitry configured to:
receive first data, as a first input to the at least one processor, the first data including masses of the attachment and the suspended cargo;
receive second data, as a second input to the at least one processor, the second data including information about a change in posture of the attachment over prescribed time as second input;
model, via the circuitry, a 3 dimensional model of the crane based on the first input and the second input and estimate a position of the attachment and the suspended cargo for the prescribed time, based on the 3 dimensional model of the crane; and
compute, via the circuitry, the possibility of interference between the external object and the attachment and the suspended cargo, based on the estimated position of the attachment and the suspended cargo,
the information about the posture includes a derricking angle of the attachment, and
the position of the attachment and the suspended cargo is estimated based on the derricking angle,
wherein the at least one processor is configured to control a movement of the crane to follow a carrying route of the suspended cargo from the 3 dimensional model generated by the circuitry to prevent the suspended cargo from contacting the external object during the movement.

5. The construction planning simulation system according to claim 4, wherein the at least one processor is configured to estimate a deformation amount of the upper turning body and a deformation amount of the attachment over the prescribed time, based on the first input and the second input, and estimate the position of the attachment and the suspended cargo that is determined depending on the deformation amounts.

6. The construction planning simulation system according to claim 4, wherein the information about the change in posture includes acceleration during the derricking of the attachment, and the position of the attachment and the suspended cargo is estimated based on the acceleration during the derricking.

7. The construction planning simulation system according to claim 4, wherein the information about the change in posture includes acceleration during turning of the attachment, and the position is estimated based on the acceleration during the turning.

8. The construction planning simulation system according to claim 4, wherein the information about the change in posture includes at least one of lifting speed at time of lifting the suspended cargo and lowering speed at time of lowering the suspended cargo, and the position is estimated based on the lifting speed at the time of lifting or the lowering speed at the time of lowering.

* * * * *